United States Patent

[11] 3,612,649

| [72] | Inventor | Donald M. Pusey |
| | | Linwood, Pa. |
| [21] | Appl. No. | 20,523 |
| [22] | Filed | Mar. 18, 1970 |
| [45] | Patented | Oct. 12, 1971 |
| [73] | Assignee | Sun Oil Company |
| | | Philadelphia, Pa. |

[54] TOOL FOR READING UNDERGROUND METERS
7 Claims, 4 Drawing Figs.

[52] U.S. Cl. .................................................. 350/115,
350/110, 350/114, 350/244
[51] Int. Cl. ........................................... G02b 27/02
[50] Field of Search .......................................... 350/110
116, 243–244, 321

[56] References Cited
UNITED STATES PATENTS
1,617,932  2/1927  Work et al. .................. 350/113

| 2,181,453 | 11/1939 | Gelakoski | 350/113 |
| 3,499,698 | 3/1970 | Malys | 350/114 X |
| 1,596,536 | 8/1926 | Hilscher | 350/243 |
| | | FOREIGN PATENTS | |
| 27,132 | 11/1912 | Great Britain | 350/112 |

Primary Examiner—David Schonberg
Assistant Examiner—Paul R. Miller
Attorneys—George L. Church, Donald R. Johnson, Wilmer E. McCorquodale, Jr. and Frank A. Rechif ABSTRACT: A portable tool for facilitating the reading from the surface of meters located underground, such as watermeters, utilizing an elongated tube containing water. This tube has a valve at one end and a squeeze bulb at the opposite end. When being used, the valve is at the lower end of the tube and the bulb at the upper end. A magnifying glass is mounted at the lower end of the tube, as is also a hook for opening the hinged covers of watermeters.

PATENTED OCT 12 1971 3,612,649
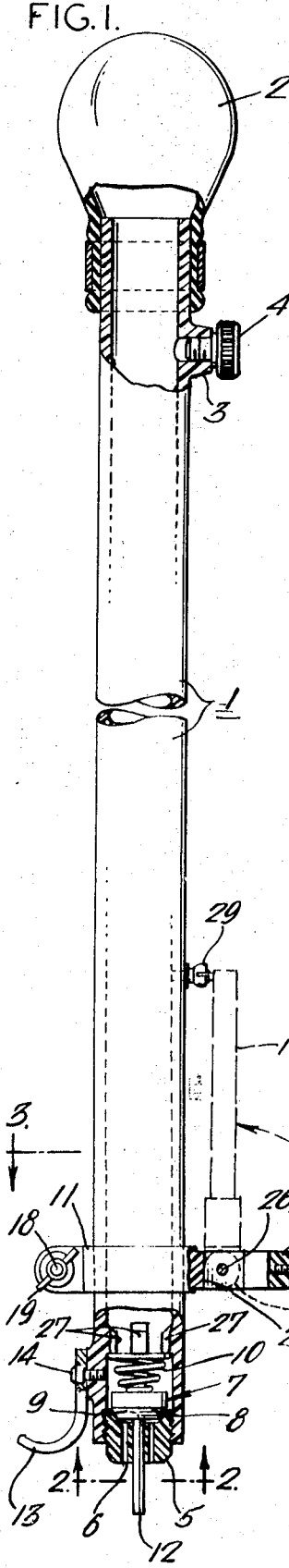
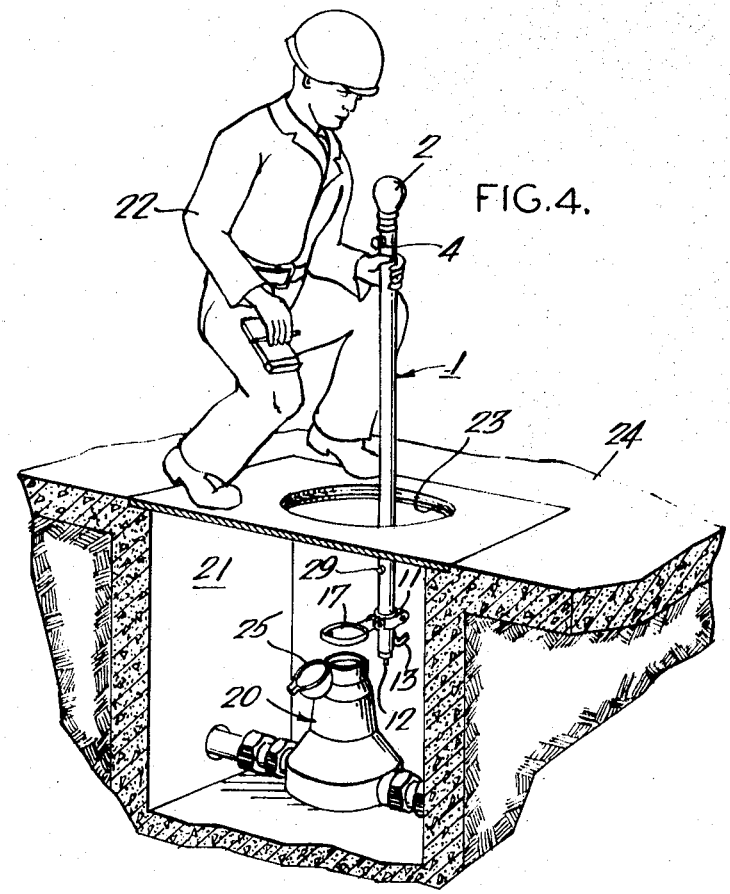
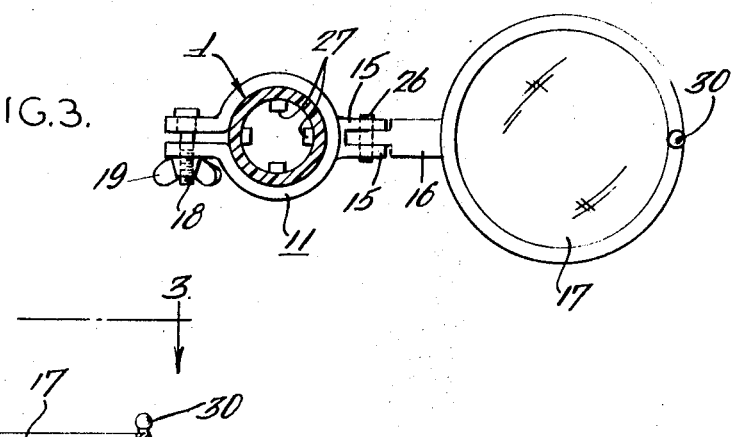
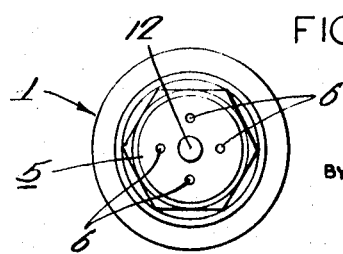
INVENTOR:
DONALD M. PUSEY
BY F. A. Rechif
ATTY.

TOOL FOR READING UNDERGROUND METERS

This invention relates to a portable tool for facilitating reading of underground meters, such as watermeters.

In processing plants such as petroleum refineries, watermeters are commonly located underground, in pits which are accessible through manholes; these watermeters must be read periodically, for accounting purposes. Quite often, the meter reader must climb down into the pit where the meter is located, in order to get a reading. These pits are sometimes filled with water, and some may be gassy; pits with an excessive amount of water must be pumped out, and safety rules require that gas-testing personnel must be summoned to the location before the meter reader can enter the pit.

The procedures just described are time-consuming and rather difficult to carry out. In addition, the faces of the meters to be read are often dirty, which has in the past necessitated that the meter reader carry with him, on his rounds, a rather bulky container filled with water for cleaning them. Also, the meter reader had to carry with him an iron hook for opening the hinged covers of the water meters to be read. Carrying of the aforementioned items, one of which is bulky, is inconvenient.

One object of this invention is to provide a novel tool for enabling the reading of underground meters. Another object is to provide a tool for enabling underground meters to be read from the surface without the necessity of entering the pits where such meters are located.

A further object is to provide a portable, lightweight meter reading tool which contains water for cleaning the faces of underground meters to be read.

A still further object is to provide a novel meter reading tool which has incorporated therewith a hook for opening the covers of watermeters to be read.

The objects of this invention are accomplished, briefly, in the following manner: A piece of tubing of fairly large diameter has at one end a flexible squeeze bulb and at its opposite end a spring-biased valve operable by means of a pressure plunger which projects out of the tubing. A hook is fastened to the tubing at the valve end thereof, as is also a magnifying glass, the latter being pivotable between an outer reading position and an inner carrying position.

A detailed description of the invention follows, taken in conjunction with the accompanying drawing, wherein:

FIG. 1 is an elevational view, partly broken away, of the tool of this invention;

FIG. 2 is a view of the lower end of the tool, looking in the direction 2—2 in FIG. 1;

FIG. 3 is a sectional view taken along line 3—3 of FIG. 1; and

FIG. 4 is a somewhat schematic view illustrating the tool of this invention in use.

Referring now to the drawing, the tool of this invention is founded upon a piece of tubing 1 approximately 5 feet in length which is adapted to contain water, i.e., to be filled with water to provide temporary water storage. The tubing 1 may be several inches in diameter and may, for example, be made of a suitable thermoplastic material. One end of the tubing is open, but is closed off from the atmosphere by a flexible rubber bulb (squeeze bulb) 2 which is sealed to this end of tubing 1. When the tubing 1 contains water, it may be expelled or discharged therefrom by manually squeezing bulb 2.

Adjacent this end, tubing 1 has therein a side port fitting 3 which is internally threaded and is closed by a threaded fill cap 4. Cap 4 may be removed in order to refill the tubing 1 with water (it being held upright or in a vertical position while being filled), after which cap 4 is replaced.

The opposite end of tubing 1 is closed at 5, as by means of a threaded closure plug, the plug 5 having four bores 6 therein (see FIG. 2) which are equally spaced on the circumference of a circle centered at the center of plug 5. The bores 6 can serve as discharge ports for the water contained in tubing 1. A valve 7, having a movable valve body member 8 disposed within tubing 1, controls the flow of water outwardly from tubing 1 through ports 6. Valve body 8 is positioned adjacent the inner face of plug 5, and has a frustoconical face 9 which is adapted to mate with a matching face on plug 5 to close off or seal the inner ends of ports or bores 6. The member 8 is biased to a closed position (wherein it closes off or seals the bores 6) by means of a conical compression spring 10 one end of which engages the inner end of body 8 (opposite to plug 5) and the other end of which engages four integral inwardly extending bosses 27 provided on the inner wall of tubing 1, near the plug end 5 thereof.

The valve 7 is operable, against the bias of spring 10, by means of a central plunger 12 whose inner end is fastened to the end of member 8 opposite to spring 10 (i.e., the outer end of this member) and which slidably extends through a central bore in closure plug 5. The plunger 12 extends outwardly beyond the closure plug 5 (i.e., externally of tubing 1) for a suitable distance, such as several inches.

It may be seen that, by pushing plunger 12 inwardly or toward the body of tubing 1, against the bias of spring 10, the valve 7 is actuated to uncover the bores 6, and then, by squeezing bulb 2 at the opposite end of the tubing, water may be forced out through the bores 6 from the interior or storage space of the tubing.

A hook 13, which is designed for opening the hinged cover of a watermeter to be read, is firmly secured to the outer surface of tubing 1 adjacent the plug end 5 thereof. The shank of hook 13 has an opening through which passes a bolt 14 which threads into a tapped boss formed on tubing 1. Hook 13 may be pointed at its tip, as illustrated.

A clamping ring 11, which is adapted to surround (encircle) the tubing 1, has at one side thereof a pair of spaced, parallel outwardly extending ears 15 between which is pivotally mounted (as by means of a pivot pin 26) the handle 16 of a magnifying glass 17, which may be 4 inches or 5 inches in diameter, for example.

The magnifying glass is pivotable between one or the other of two selected positions which are illustrated in FIG. 1. In the solid-line or "reading" position, the handle 16 extends outwardly from tubing 1 substantially at right angles to the tubing longitudinal axis. During reading of a watermeter, the glass 17 is maintained in this position by means of a "flat" on that portion of handle 16 which extends between the ears 15, this "flat" coming into engagement with a planar surface 28 on ring 11, between ears 15. The downward (in FIG. 1) rotation of glass 17 is limited by the "flat" engaging the aforesaid surface 28. In the dashed-line or "carrying" position, the handle 16 and the glass 17 lie along the outside of tubing 1, substantially parallel to the tubing axis. The glass is detented in this latter position by means of a spring clip member 29 secured to the outside of tubing 1 and adapted to receive and resiliently retain a spherical pin 30 secured to the outer end of the frame which carries the magnifying glass 17.

Diametrically opposite to ears 15, the ring 11 is split to form two outwardly extending ears. A bolt 18, on the outer end of which is threaded a wingnut 19, passes through these two last-mentioned ears. By tightening wingnut 19 on bolt 18, these two ears may be moved toward each other to firmly secure the clamping ring 11 in position on the outside of tubing 1.

Now refer to FIG. 4, which illustrates the portable tool of this invention being used to enable the reading of a watermeter 20 located in a pit 21. After the meter reader or gauger 22 has removed the cover from the manhole 23, he inserts the fabricated tool vertically down through the manhole with the bulb end of the tool uppermost and the valve and hook end of the tool lowermost. Prior to this, of course, the tool user 22 will have pulled the pin 30 loose from its clip 29 and pivoted the magnifying glass 17 from its dashed-line "carrying" position (FIG. 1) to its solid-line "reading" position; the glass is allowed to pivot downwardly until stopped in this latter position by the "flat" on handle 16 coming into engagement with surface 28 on ring 11.

It may be noted, as illustrated in FIG. 4, that the tool may be utilized, and the meter 20 read, from the ground level 24, it being unnecessary for the reader 22 to enter the pit 21 via the manhole 23.

First, the hook 13 mounted on the tool is utilized to open the hinged cover 25 of meter 20. Next, if the glass cover over the face of the meter is dirty, the plunger 12 is pushed against this cover to open valve 7 and then, while holding this valve open, bulb 2 is squeezed to force water out of the tubing 1 through the bores 6, the result being to wash the dirt off the glass meter cover.

Following this, the magnifying glass 17 is placed in an appropriate location, as illustrated, with respect to the meter face to provide a magnified image of the face for viewing by the reader 22 from his station at ground level; the meter is then read and the reading recorded.

As the meter reader 22 makes his rounds, the supply of water in tubing 1 is replenished, as necessary, by way of side port 3, after fill cap 4 is removed. While the portable tool is being carried between meter locations, the magnifying glass 17 is preferably folded down against tubing 1 and retained in the dashed-line "carrying" position of FIG. 1.

Modifications in the nature of improvements of the structure described may suggest themselves to those skilled in the art. For example, it may be desirable in some cases to attach a sponge to the bottom of the hook 13 or to the tubing 1, to enable the glass meter cover to be wiped off.

I claim:

1. In a portable tool for facilitating reading of meters in subterranean locations, an elongated tube adapted to contain a liquid, a collapsible hollow squeeze bulb at one end of said tube and communicating with the interior thereof, a liquid discharge port at the other end of said tube, and a plunger-actuatable valve for controlling the flow of liquid from the interior of said tube through said discharge port.

2. Structure of claim 1, including also a liquid filling port communicating with the interior of said tube and located adjacent said bulb.

3. Structure according to claim 1, wherein the plunger for said valve projects outwardly from said tube, and wherein the inward movement of said plunger with respect to said tube actuates said valve to place said discharge port in communication with the interior of said tube.

4. Structure of claim 1, including also a hook member secured to the exterior of said tube at said other end thereof, the point of said hook member extending outwardly with respect to the longitudinal axis of said tube.

5. Structure of claim 1, including also a magnifying glass, and means mounting said glass on the exterior of said tube at said other end thereof.

6. Structure defined in claim 5, wherein said means provides a pivotal connection between said glass and said tube, enabling said glass to be pivoted with respect to said tube.

7. Structure of claim 1, including also a magnifying glass, means mounting said glass on the exterior of said tube at said other end thereof, and a hook member secured to the exterior of said tube at said other end thereof and diametrically opposite said glass, the point of said hook member extending outwardly with respect to the longitudinal axis of said tube.